US012549600B1

(12) United States Patent
Yarabolu

(10) Patent No.: US 12,549,600 B1
(45) Date of Patent: Feb. 10, 2026

(54) DETECTION AND PREVENTION OF ARTIFICIAL INTELLIGENCE ATTACKS USING DIGITAL TWIN BASED ARTIFICIAL INTELLIGENCE CENTRIC POLYMORPHIC HONEY NET

(71) Applicant: Bank of America Corporation, Charlotte, NC (US)

(72) Inventor: Vijay Kumar Yarabolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 54 days.

(21) Appl. No.: 18/751,240

(22) Filed: Jun. 22, 2024

(51) Int. Cl.
*H04L 29/06* (2006.01)
*H04L 9/40* (2022.01)

(52) U.S. Cl.
CPC ...... *H04L 63/1491* (2013.01); *H04L 63/1425* (2013.01)

(58) Field of Classification Search
CPC ............. H04L 63/1491; H04L 63/1425; G06F 16/9574
See application file for complete search history.

(56) References Cited

U.S. PATENT DOCUMENTS

| | | | |
|---|---|---|---|
| 11,050,787 B1 | 6/2021 | Sharifi Mehr | |
| 11,611,586 B2 | 3/2023 | Strogov et al. | |
| 2006/0101516 A1* | 5/2006 | Sudaharan | H04L 63/0263 726/23 |
| 2020/0036750 A1* | 1/2020 | Bahnsen | H04L 63/1416 |
| 2020/0329067 A1* | 10/2020 | Dani | H04L 63/1416 |
| 2021/0067553 A1* | 3/2021 | Ries | H04L 63/0263 |
| 2021/0160284 A1* | 5/2021 | Strogov | H04L 63/0245 |

OTHER PUBLICATIONS

Sentinelone, "What Is Polymorphic Malware? An Easy Guide 101", retrieved online at: < https://www.sentinelone.com/cybersecurity-101/what-is-polymorphic-malware/>, Jun. 13, 2024, pp. 1-7.
Blackberry, "What Is Polymorphic Malware?", retrieved online at: https://www.blackberry.com/us/en/solutions/endpoint-security/ransomware-protection/polymorphic-malware#what-is-it <https://www.blackberry.com/us/en/solutions/endpoint-security/ransomware-protection/polymorphic-malware>, Apr. 9, 2024, pp. 1-4.
Sims, Jeff. Hyas, "Blackmamba: Using AI to Generate Polymorphic Malware", retrieved online at: < https://www.hyas.com/blog/blackmamba-using-ai-to-generate-polymorphic-malware>, Apr. 9, 2024, pp. 1-8.

* cited by examiner

*Primary Examiner* — Wasika Nipa
(74) *Attorney, Agent, or Firm* — Banner & Witcoff, Ltd.

(57) ABSTRACT

A computing platform may train a machine learning model to detect and analyze threat actor activities. The computing platform may generate dynamic honeynets and deploy the generated dynamic honeynets as adaptive defenses to threat actors in a computing environment. The computing platform may adapt to threat actor activities based on the analyzed behavior of the threat actor and any identified tools used by the threat actor to gain access to the computing system. The computing platform includes a digital twin infrastructure that causes redirection of the threat actor into a specific controlled computing environment including sandboxes through generation and deployment of dynamic honeynets.

17 Claims, 5 Drawing Sheets

DETECTION AND PREVENTION OF ARTIFICIAL INTELLIGENCE ATTACKS USING DIGITAL TWIN BASED ARTIFICIAL INTELLIGENCE CENTRIC POLYMORPHIC HONEY NET

BACKGROUND

Aspects of the disclosure relate to electrical computers, systems, and devices for generating artificial intelligence dynamic honeynets and deploying digital twin infrastructure, the artificial intelligence dynamic honeynets and digital twin infrastructure providing adaptive defenses to threat actors in a computer environment.

Enterprise computer systems may be subject to a large number of data entry attacks, such as malware, computer viruses, worms, trojan horses, ransomware, spyware, adware, scareware, phishing, fraud, and/or other potentially harmful schemes that may be either the same as or similar to data entry attacks being utilized by threat actors. In some cases, malicious code may be disguised as benign code and/or may be otherwise hidden so that when an application is launched, a webpage accessed, the malicious code may run in the background unnoticed until too late.

Moreover, enterprise computing systems (e.g., educational institution computing systems, corporate computing systems, financial institution computing systems, government computing systems and the like) may be constantly bombarded with data, both legitimate and illegitimate. In some cases, unauthorized individuals and/or threat actors may attempt to gain access into the enterprise computing system from any number of external sources, such as via email attachments, web browser provided links, and the like. With current technology solutions, threat control teams have difficulty in providing computing systems to prevent threat actors from bypassing network border controls and attempting to obtain unauthorized access to the protected enterprise networks. Regardless of the tools implemented, threat mitigation controls tend to focus on closing or at least identifying a specific gap in the implemented security measures and then preventing those gaps from being misused.

In some instances, artificial intelligence is being used by threat actors to build sophisticated attacks that may learn from conditions where the attack is deployed. The attack may be adjusted in real-time such that it makes it difficult for traditional cyber defense systems to track and remediate them. These attacks are dynamic in nature with no consistent pattern to study. As each attack is unique, it is imperative to have a security platform that learns as threats are happening and is capable of solution generation with no impact on existing infrastructure.

Current static honeynets may create false sets of data that appear to the threat actor as being an authentic part of the enterprise organization's confidential or proprietary information. However, these static honeynets do not adapt to protect the enterprise organization computing systems. In addition, existing static honeynets often take an excessive amount of time to create and deploy into computing networks. Accordingly, it is advantageous to provide a dynamic honeynet generation and digital twin infrastructure platform that adapts to breaches based on at least threat actor behavior and any identified tools used to gain access to avoid malicious activity by threat actors.

SUMMARY

Aspects of the disclosure provide effective, efficient, scalable, and convenient technical solutions that address and overcome the technical problems associated with providing deterrence, adaptive defense, and intelligence gathering on threat actors and their associated threat activities in a computing environment. An artificial intelligence computing platform may train a machine learning model to detect and analyze threat actor activities. The artificial intelligence computing platform may generate dynamic honeynets and deploy the generated dynamic honeynets as adaptive defenses to threat actors in a computing environment. The artificial intelligence computing platform may adapt to threat actor activities based on the analyzed behavior of the threat actor and any identified tools used by the threat actor to gain access to the computing system. The artificial intelligence computing platform includes a digital twin infrastructure that causes redirection of the threat actor into a specific controlled computing environment including sandboxes through generation and deployment of dynamic honeynets.

In one or more instances, generated dynamic honeynets and associated digital twin infrastructure may be deployed into a sandbox environment within the enterprise computing network. The deployment of the generated dynamic honeynets into the sandbox environment may entice the threat actor into the sandbox environment. In these instances, the sandbox environment may isolate and allow for further analysis of a threat actor's patterns or tactics for additional insights and system security.

BRIEF DESCRIPTION OF DRAWINGS

The present disclosure is illustrated by way of example and is not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired, or wireless, and that the specification is not intended to be limiting in this respect.

Figure 1A:
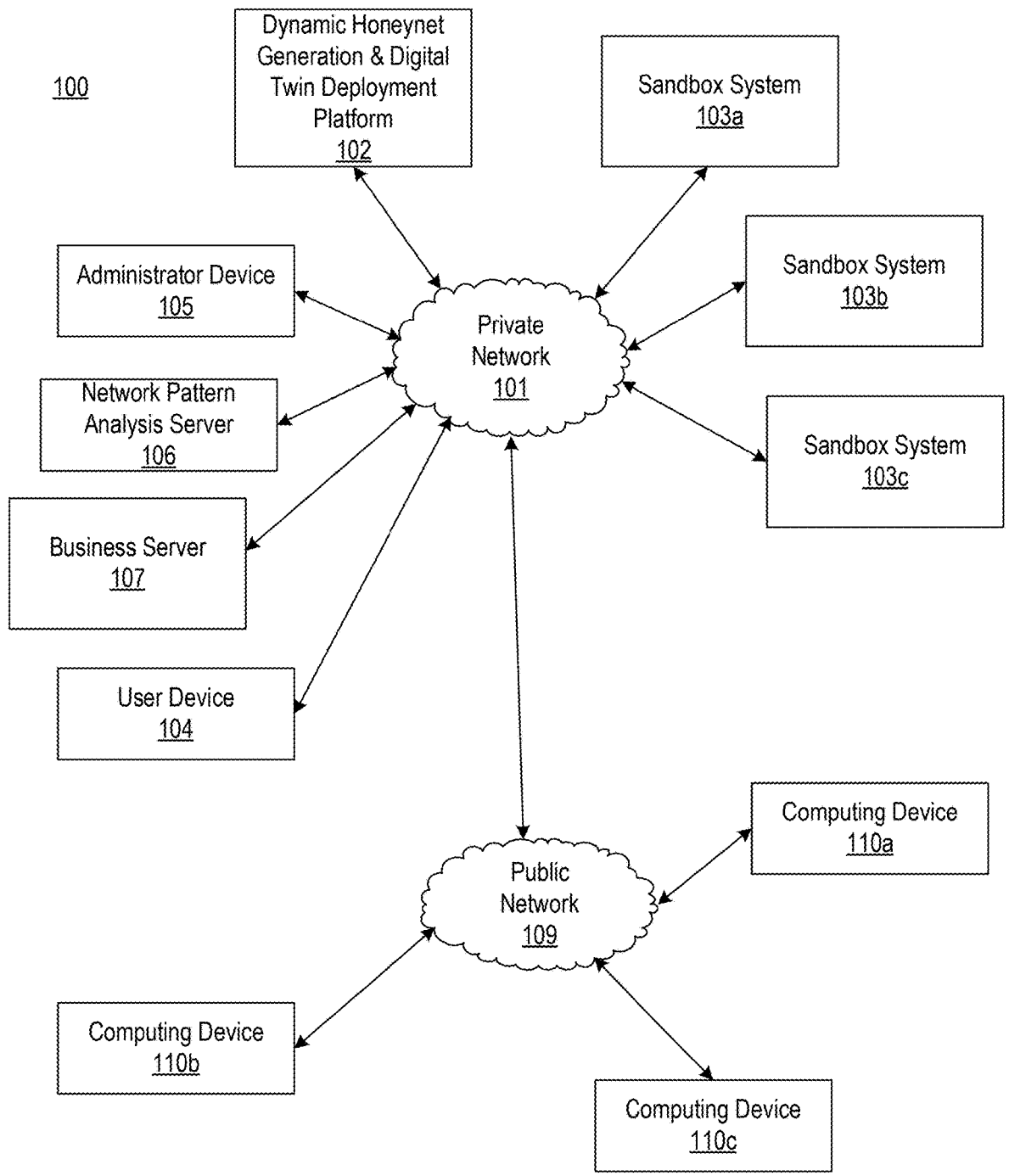
FIGS. 1A and 1B depict an illustrative computing environment for generating and deploying a digital twin environment and dynamic honeynets in accordance with one or more example embodiments.
Figure 1B:
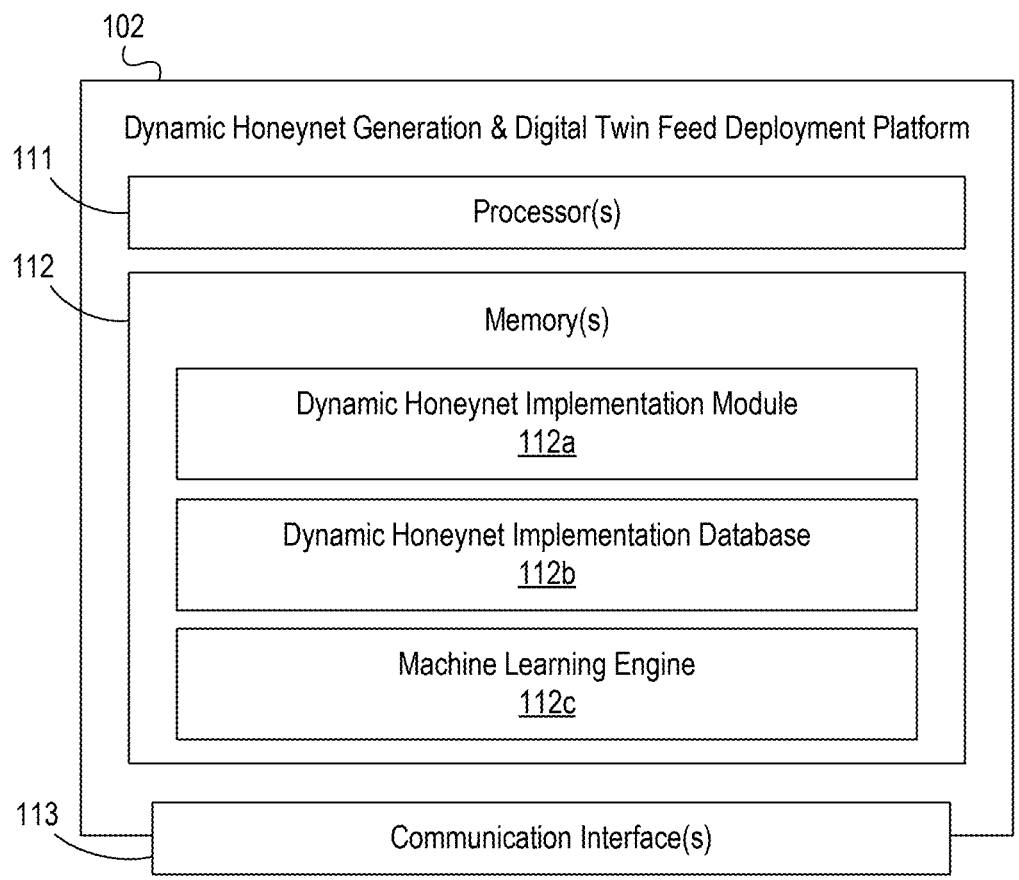

FIGS. 1A-1B depict an illustrative computing environment for dynamic honeynet generation and deployment of digital twin infrastructure in accordance with one or more example embodiments. Referring to FIG. 1A, computing environment 100 may include one or more computer systems. For example, computing environment 100 may include dynamic honeynet generation and digital twin platform 102, sandbox systems 103a, 103b, and 103c, user device 104, administrator device 105, network pattern analysis server 106, business server 107, and computing devices 110a, 110b, and 110c. The above systems and devices may be communicatively coupled via one or more computing networks (e.g., private network 101, public network 109, and the like).

Dynamic honeynet generation and digital twin platform 102 may include one or more computing devices (servers, server blades, or the like) and/or other computer components (e.g., processors, memories, communication interfaces, or the like). For example, the dynamic honeynet generation and digital twin platform 102 may include a number of server endpoints and may be configured to monitor potential threat actor activity at these endpoints. In some instances, the dynamic honeynet generation and digital twin platform 102 may further be configured to train, host, and execute a machine learning model to monitor, evaluate, and generate dynamic honeynets in response to the detection and activity of threat actors on private network 101. In some embodiments, an entire organization's computing network may be fully or partially replicated by a digital twin network to simulate the full production environment of the enterprise. In some embodiments, dynamic honeynet generation and digital twin platform 102 may determine which portions of an enterprise's computing network should be replicated. In some arrangements, the created digital twin network may be positioned in sandboxes 103a, 103b, and 103c. In another embodiment, dynamic honeynet generation and digital twin platform 102 may determine what portions of the generated digital twin network are in sandboxes 103a, 103b, and 103c.

Sandbox systems 103a, 103b, and 103c may include one or more computing devices (servers, server blades, or the like) and/or other computer components (e.g., processors, memories, communication interfaces, or the like). In some instances, the sandbox systems 103a, 103b, and 103c may be configured to include honeynet environments associated with the digital twin network. The dynamic honeynet generation and digital twin platform 102 may entice threat actors to sandbox systems 103a, 103b, and 103c. In these instances, the sandbox systems 103a, 103b, and 103c may isolate and/or otherwise analyze a threat actor's patterns or tactics for additional insights and system security. In some instances, the secure sandbox systems 103a, 103b, and 103c may be separate from the dynamic honeynet generation and digital twin platform 102. In other instances, the sandbox systems 103a, 103b, and 103c may be integrated into the dynamic honeynet generation and digital twin platform 102.

Insights that may be determined from analysis of the threat actor's patterns or tactics may be used to train the machine learning model and internal cyber security personnel. Learnings may lead to the generation of more realistic and enticing environments and/or dynamic honeynets. For instance, dynamic honeynets provide real-time adaptive threat protection that may be generated with specific purposes based on threat activity analysis. The additional insights may assist in generating specific purpose dynamic honeynets. In some arrangements, counter-security solutions and security policies may be generated based on the learnings. In an embodiment, the digital twin network and sandboxes may be used by dynamic honeynet generation and digital twin platform 102 to test the learned counter-security solutions and security policies to determine if effective against threat actors utilizing artificial intelligence model attack malware. Successfully tested and efficiently performing counter-security solutions and security policies may be automatically implemented on an enterprise's physical network.

User device 104 may be or include one or more devices (e.g., laptop computers, desktop computer, smartphones, tablets, and/or other devices) configured for use in conducting business on behalf of the enterprise organization. In some instances, the user device 104 may be operated by an employee of the enterprise organization. In some instances, the user device 104 may be configured to display graphical user interfaces (e.g., information interfaces, or the like). Any number of such user devices may be used to implement the techniques described herein without departing from the scope of the disclosure.

Administrator device 105 may be or include one or more devices (e.g., laptop computers, desktop computer, smartphones, tablets, and/or other devices) configured for use in providing information security. For example, the administrator device 105 may be used by an employee of an organization (e.g., such as an organization corresponding to the dynamic honeynet generation and digital twin platform 102). In some instances, the administrator user device 105 may be configured to display graphical user interfaces (e.g., honeynet generation and deployment implementation interfaces, access monitoring summary interfaces, or the like). Any number of such user devices may be used to implement the techniques described herein without departing from the scope of the disclosure.

Network platform analysis server 106 may monitor and analyze activities for the computing environment 100. The network pattern analysis server 106 may include an AI engine processing an AI model that may be trained (continually trained, periodically trained) based on the common activity patterns to allow the network pattern analysis engine to remove or otherwise filter the common activity patterns from analysis to efficiently identify abnormal or unusual activity patterns indicative of potential malicious attempts to gain access to the enterprise network.

Activity patterns aggregated from computing devices across the network, including from the network pattern analysis server 106 may be stored in the database, along with the AI model. A network pattern analysis engine (as part of network pattern analysis server 106), once the baseline commonly used activity patterns are filtered from monitoring operations, may identify unusual or unexpected activity patterns that may indicate an attempt to breach into the network and may continually learn and adapt based on each successive analysis. The network pattern analysis engine 106 may be able to identify a targeted attack, such as those focused on a specific computing device from an outside threat actor by analyzing unusual or unexpected activities that may indicate that an advanced threat actor that is trying, for example, to identify network identification information to bypass security measures, leverage known operating system vulnerabilities, and/or to identify when applications or scripts attempt to invoke functionality subject to the vulnerabilities.

Business server 107 may be or include one or more devices (e.g., laptop computers, desktop computers, smartphones, tablets, and/or other devices) configured for use in conducting enterprise business. Numerous business servers along with business server 107 may be networked to provide applications and information to users of the enterprise organization.

In one or more arrangements, dynamic honeynet generation and digital twin platform 102, sandbox systems 103a, 103b, and 103c, user device 104, administrator device 105, network pattern analysis server 106, and business server 107 may be any type of computing device capable of receiving a user interface, receiving input via the user interface, and communicating the received input to one or more other computing devices. For example, dynamic honeynet generation and digital twin platform 102, sandbox systems 103a, 103b, and 103c, user device 104, administrator device 105, network pattern analysis server 106, and business server 107 and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of dynamic honeynet generation and digital twin platform 102, sandbox systems 103a, 103b, and 103c, user device 104, administrator device 105, network pattern analysis server 106, and business server 107 may, in some instances, be special-purpose computing devices configured to perform specific functions.

Referring to FIG. 1B, dynamic honeynet generation and digital twin platform 102 may include one or more processors 111, memory 112, and communication interface 113. A data bus may interconnect processor 111, memory 112, and communication interface 113. Communication interface 113 may be a network interface configured to support communication between dynamic honeynet generation and digital twin platform 102 and one or more networks (e.g., network 101, or the like). Memory 112 may include one or more program modules having instructions that when executed by processor 111 cause dynamic honeynet generation and digital twin platform 102 to perform one or more functions described herein and/or one or more databases that may store and/or otherwise maintain information which may be used by such program modules and/or processor 111. In some instances, the one or more program modules and/or databases may be stored by and/or maintained in different memory units of dynamic honeynet generation and digital twin platform 102 and/or by different computing devices that may form and/or otherwise make up dynamic honeynet generation and digital twin platform 102. For example, memory 112 may have, host, store, and/or include dynamic honeynet implementation module 112a, dynamic honeynet implementation database 112b, and machine learning engine 112c. Dynamic honeynet implementation module 112a may have instructions that direct and/or cause dynamic honeynet generation and digital twin platform 102 to execute advanced techniques to detect threat actors and implement security measures accordingly. Dynamic honeynet database 112b may store information used by dynamic honeynet module 112a, in performing threat actor detection, dynamic honeynet implementation, and/or in performing other functions. Machine learning engine 112c may be used to train, deploy, and/or otherwise refine models used to support functionality of the dynamic honeynet implementation module 112a through both initial training and one or more dynamic feedback loops, which may, e.g., enable continuous improvement of the dynamic honeynet generation and digital twin platform 102 and further optimize the detection of threat actor activity.

Figure 2:
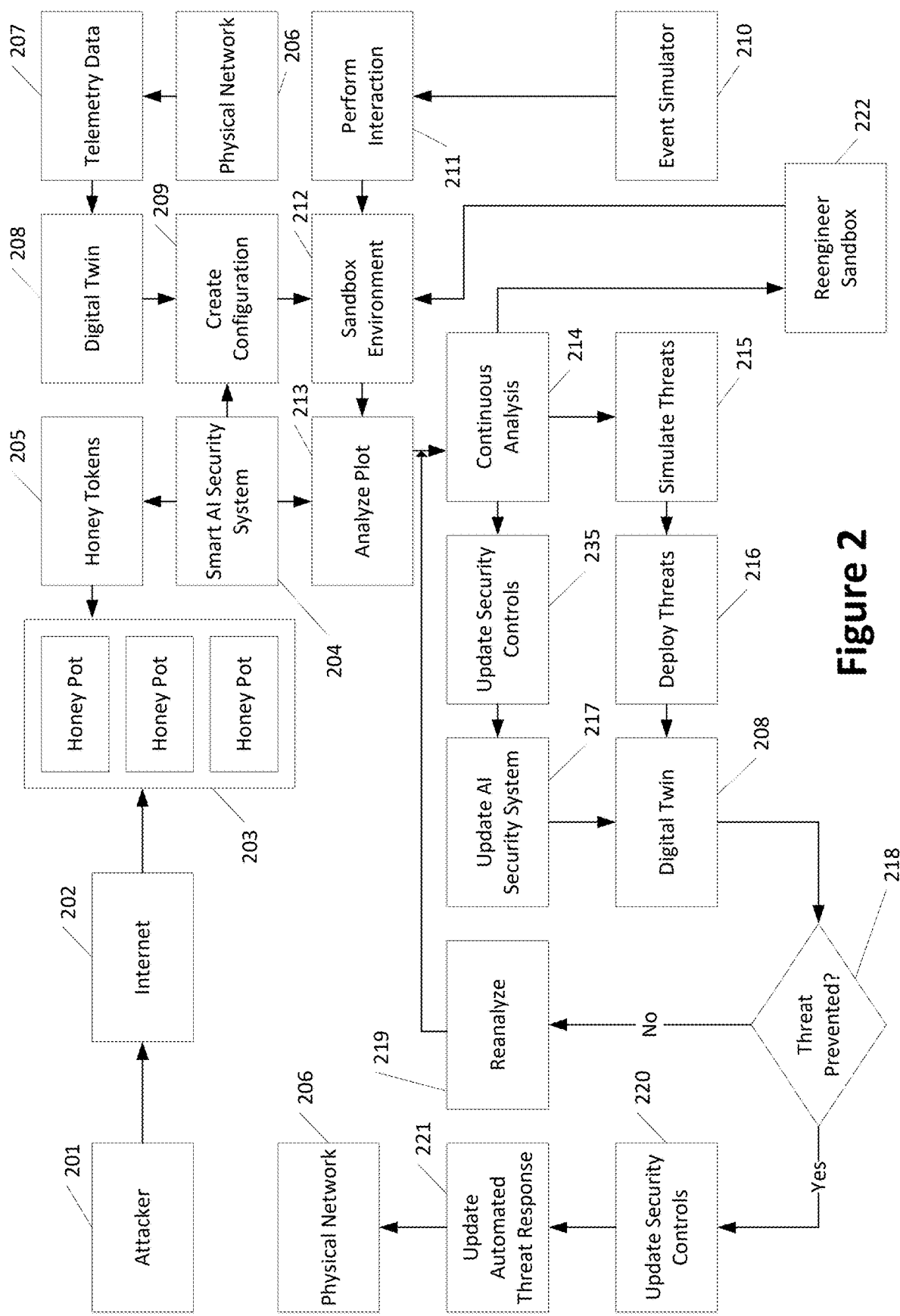
FIG. 2 depicts an illustrative method for generating dynamic honeynets and deploying a digital twin infrastructure in accordance with one or more example embodiments.

FIG. 2 depicts an illustrative method for generating dynamic honeynets and deploying a digital twin infrastructure in accordance with one or more example embodiments. Referring to FIG. 2, the dynamic honeynet generation and digital twin platform 102 may train a machine learning model for threat actor detection. For example, the dynamic honeynet generation and digital twin platform 102 may receive historical pattern information (e.g., what was accessed, where it was accessed from, communication information, how often information was accessed, and/or other information). In some instances, this information may be labelled based on whether or not the corresponding pattern was ultimately identified as corresponding to a threat actor.

In some instances, the dynamic honeynet generation and digital twin platform 102 may also train the machine learning model using identified threat actor event occurrences. Information regarding each identified threat actor event occurrence may include information such as traffic logs, activity patterns, artifacts, behavioral information, scope of compromise, statistics, tools detected, third party resource information, and any determined tactics, techniques, or procedures used by the threat actor, or the like.

In some instances, in training the machine learning model, dynamic honeynet generation and digital twin platform 102 may use one or more supervised learning techniques (e.g., decision trees, bagging, boosting, random forest, k-NN, linear regression, artificial neural networks, support vector machines, and/or other supervised learning techniques), unsupervised learning techniques (e.g., classification, regression, clustering, anomaly detection, artificial neural networks, and/or other unsupervised models/techniques), and/or other techniques.

As illustrated in FIG. 2, dynamic honeynet generation and digital twin platform 102 may generate a honeynet 203. The honeynet 203 may include numerous honeypots for deployment in a generated digital twin environment. The honeynet 203 may be deployed by an artificial intelligence smart security system 204 which may be part of dynamic honeynet generation and digital twin platform 102. The artificial intelligence smart security system 204 may utilize honey tokens.

Dynamic honeynet generation and digital twin platform 102 may generate dynamic honeynets based on determined insights. For instance, dynamic honeynet generation and digital twin platform 102 may generate dynamic honeynets based on the scanning tool being used by the threat actor. For example, if it is determined that the threat actor is using a port detection tool, dynamic honeynet generation and digital twin platform 102 may generate dynamic honeynets having open ports and strategically placing those generated dynamic honeynets in specific locations in the enterprise computing network. In another embodiment, if it is determined that the threat actor is using a missing patch scanner detection tool, dynamic honeynet generation and digital twin platform 102 may generate dynamic honeynets having missing software patches and strategically place those generated dynamic honeynets in specific locations in the enterprise computing network. In yet another embodiment, if it is determined that the threat actor is scanning for missing signatures using a detection tool, dynamic honeynet generation and digital twin platform 102 may generate dynamic honeynets having missing signatures and strategically place those generated dynamic honeynets in specific locations in the enterprise computing network.

In an embodiment, a digital twin 208 of the enterprise computing system may be generated based on the enterprise physical network 206 and telemetry data 207. The digital twin 208 may be a copy of the enterprise network and indistinguishable from the enterprise network. In some arrangements, artificial intelligence smart security system 204 may create configuration settings 209 for digital twin 208.

A threat actor 201 may via the Internet 202 gain access to the enterprise network. The threat actor 201 may be attracted to honeynet 203 deployed on top of the digital twin 208 in sandbox environment 212. In an aspect of the disclosure, digital twin 208 may reside in a secure sandbox environment 212. Dynamic honeynet generation and digital twin platform 102 may analyze threat actor plots 213 based on activity occurring in sandbox environment 212.

Dynamic honeynet generation and digital twin platform 102 may attempt to identify insights using a correlation tool. For example, dynamic honeynet generation and digital twin platform 102 may feed the internal information into the correlation tool to attempt to identify the behavioral patterns of the threat actor. In addition, the correlation tool may also determine the type of attack being used, and any tools being used by the threat actor. Dynamic honeynet generation and digital twin platform 102 may execute continuous analysis 214 and reengineer the sandbox 222 based on the analysis.

In some embodiments, an event simulator 210 and performance interactions 211 may be tested in the sandbox environment 212. For instance, dynamic honeynet generation and digital twin platform 102 may inject and/or otherwise incorporate decoy information into the internal information storage systems along with the internal information, which may, for example, function as noise to disrupt and/or otherwise obscure the internal information.

In another embodiment, dynamic honeynet generation and digital twin platform 102 may create environments based on detected threat activity. For instance, dynamic honeynet generation and digital twin platform 102 may determine that different environments are needed for a password login attempt attack, a detected remote code execution attack, and/or a suspicious lateral movement detection. In an embodiment, the dynamic honeynets generated and deployed may be different in each of those attack scenarios.

In another example, dynamic honeynet generation and digital twin platform 102 may generate a honeypot as part of the honeynet that represents a server with an open proxy configuration. The honeypot may entice a threat actor to focus their attention on what the threat actor perceives as a server with a misconfigured HTTP proxy.

Dynamic honeynet generation and digital twin platform 102 may monitor the enterprise network for detection of a threat actor. For example, dynamic honeynet generation and digital twin platform 102 may monitor for internal network anomalies. In an embodiment, dynamic honeynet generation and digital twin platform 102 may establish a data connection with network pattern analysis server 105 in step 204 to look for abnormal network patterns for use in the detection of threat actor activity.

Returning to FIG. 2, dynamic honeynet generation and digital twin platform 102 may update security controls 235 for an updated artificial intelligence security system 217. In an embodiment, dynamic honeynet generation and digital twin platform 102 may simulate threats 215 and deploy the simulated threats 216 on digital twin 208 to determine if the updated artificial intelligence security system 217 can prevent the simulated threat from harming digital twin infrastructure. If the simulated threat is prevented 218, the physical network's 206 security controls 220 and threat response 221 may be automatically updated. If the simulated threat is not prevented, dynamic honeynet generation and digital twin platform 102 may re-analyze 219 and continue to perform continuous analysis 214 to determine a solution to the simulated threat.

Dynamic honeynet generation and digital twin platform 102 may send a honeynet deployment notification to user device 104 and administrator device 105. For example, the dynamic honeynet generation and digital twin platform 102 may send the honeynet deployment notification to user device 104 and/or administrator device 105 via the communication interface. In some instances, the dynamic honeynet generation and digital twin platform 102 may also send one or more commands directing the administrator device 105 to display the honeynet deployment notification (e.g., via a dynamic implementation interface). In some instances, the honeynet deployment notification may be generated and/or otherwise sent via a reporting system integrated into the dynamic honeynet generation and digital twin platform 102 and/or other devices.

Figure 3:
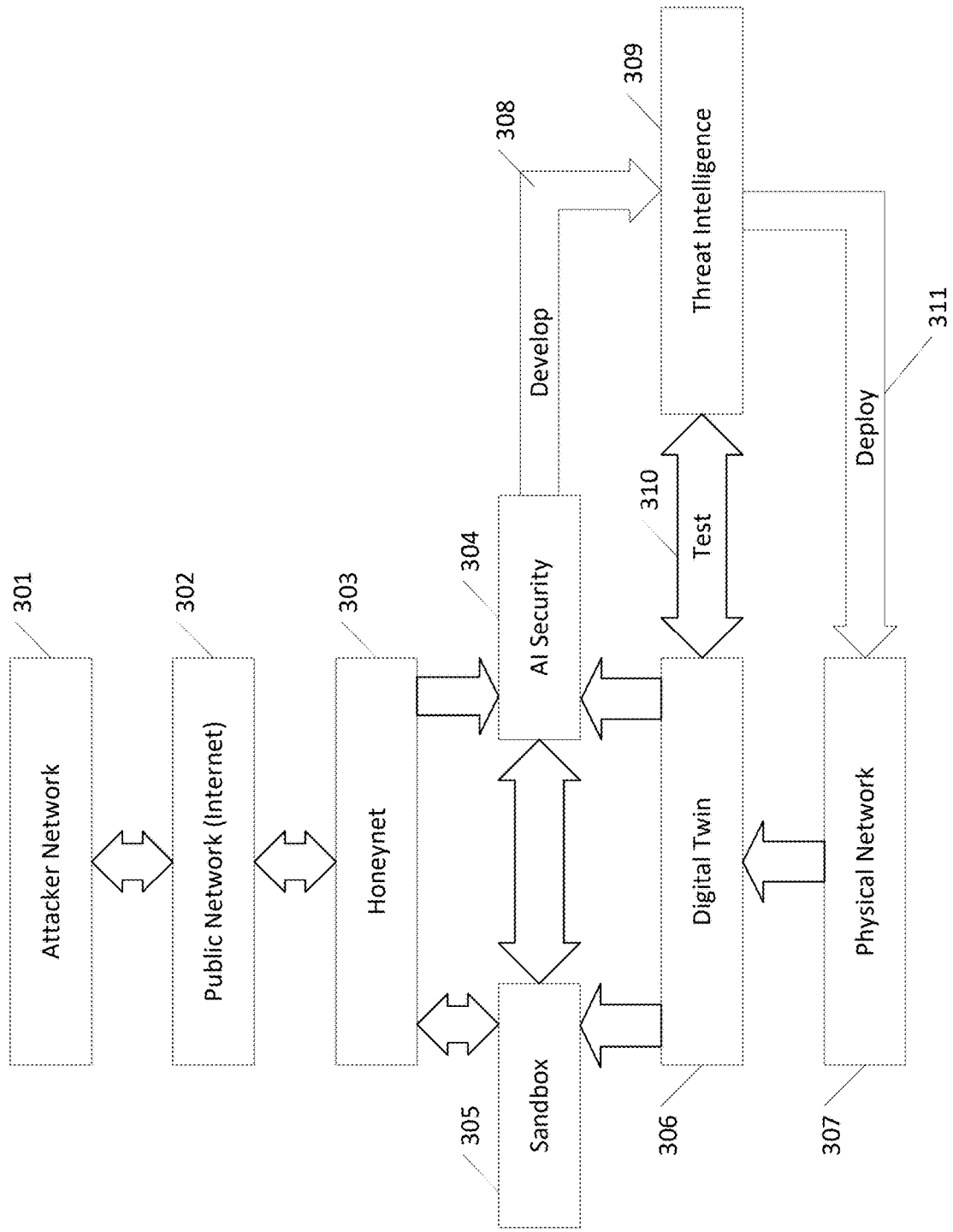
FIG. 3 depicts a further illustrative method for generating dynamic honeynets and deploying a digital twin infrastructure in accordance with one or more example embodiments.

FIG. 3 depicts a further illustrative method for generating dynamic honeynets and deploying a digital twin infrastructure in accordance with one or more example embodiments. In FIG. 3, a threat actor may attempt to access enterprise resources from a threat actor's network 301 via a public network 302. A dynamic honeynet generation and digital twin platform 102 may in some arrangements, deploy a honeynet 303 to protect enterprise resources. The honeynet may comprise honeypots. A digital twin 306 of the enterprise's network may be generated and stored in sandbox 305. The honeynet 303 may attract threat actors to the digital twin 306 stored in sandbox box 305. An artificial intelligence security system 304 may analyze the detected threat actor activity and develop learnings 308 comprising counter-security policies. A threat intelligence engine 309 as part of a dynamic honeynet generation and digital twin platform 102 may test 310 the developed counter-security policies on the digital twin 306 and if successful automatically deploy 311 the counter-security policies on physical network 307.

Figure 4:
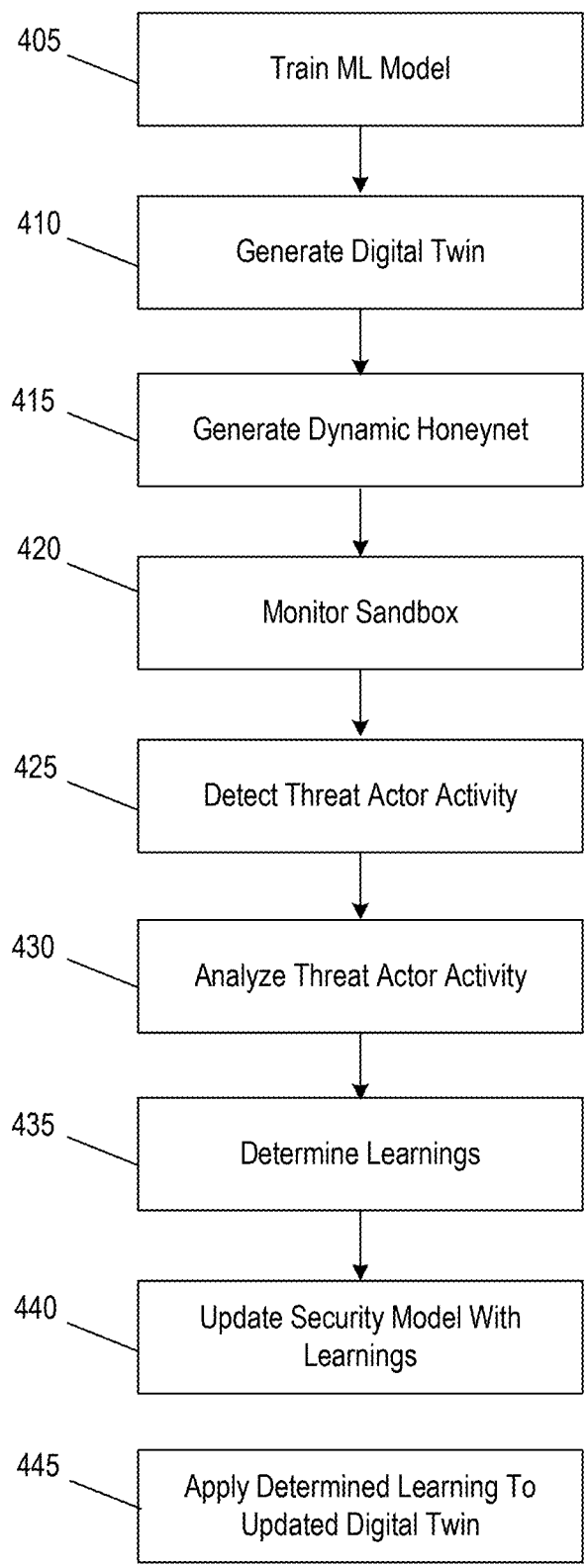
FIG. 4 depicts an illustrative method for detecting threat actor activity with a generated and deployed digital twin environment and associated dynamic honeynets in accordance with one or more example embodiments.

FIG. 4 depicts an illustrative method for detecting threat actor activity with a generated and deployed digital twin environment and associated dynamic honeynets in accordance with one or more example embodiments. Referring to FIG. 4, dynamic honeynet generation and digital twin platform 102 may comprise one or more processors, memory, and a communication interface. At step 405, dynamic honeynet generation and digital twin platform 102 may train a machine learning model to identify threat actor activity. For example, dynamic honeynet generation and digital twin platform 102 may train the machine learning model using historical information such as identified threat actor event occurrences. Information regarding each identified threat actor event occurrence may include information such as traffic logs, activity patterns, artifacts, behavioral information, scope of compromise, statistics, tools detected, third party resource information, and any determined tactics, techniques, or procedures used by the threat actor, or the like.

At step 410, dynamic honeynet generation and digital twin platform 102 may generate a digital twin representing at least part of a physical network.

At step 415, dynamic honeynet generation and digital twin platform 102 may generate at least one dynamic honeynet, the generated dynamic honeynet associated with the digital twin. For instance, dynamic honeynet generation and digital twin platform 102 may generate dynamic honeynets based on the scanning tool being used by the threat actor.

At step 420, dynamic honeynet generation and digital twin platform 102 may monitor a sandbox that includes the generated digital twin and the generated at least one dynamic honeynet for threat actor activity.

At step 425, dynamic honeynet generation and digital twin platform 102 may detect threat actor activity located in the sandbox.

At step 430, dynamic honeynet generation and digital twin platform 102 may analyze with an artificial intelligence machine learning model security system, the detected threat actor activity. For instance, dynamic honeynet generation and digital twin platform 102 may feed the information, into a correlation tool to attempt to identify behavioral patterns of the threat actor. In an embodiment, the correlation tool may be part of the machine learning model. In addition, the correlation tool may also determine the type of attack being used and any tools being used by the threat actor.

At step 435, dynamic honeynet generation and digital twin platform 102 may determine learnings from the analyzed threat actor activity, the learnings comprising counter-security policies.

At step 440, dynamic honeynet generation and digital twin platform 102 may update the artificial intelligence machine learning model security system with the determined learnings.

At step 445, dynamic honeynet generation and digital twin platform 102 may apply the determined learnings to an updated digital twin.

In an embodiment, dynamic honeynet generation and digital twin platform 102 may input all additional discovered information regarding the threat activities into the machine learning model to update the machine learning model and to generate updated learnings.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entire hardware embodiment, an entire software embodiment, an entire firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, one or more computer-readable media may be and/or include one or more non-transitory computer-readable media.

As described herein, the various methods and acts may be operative across one or more computing servers and one or more networks. The functionality may be distributed in any manner or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any, and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   generate a digital twin representing at least part of a physical network;
   generate at least one dynamic honeynet, the generated dynamic honeynet associated with the digital twin;
   monitor a sandbox that includes the generated digital twin and the generated at least one dynamic honeynet for threat actor activity;
   detect threat actor activity located in the sandbox;
   analyze with an artificial intelligence machine learning model security system, the detected threat actor activity;
   determine learnings from the analyzed threat actor activity, the learnings comprising counter-security policies;
   update the artificial intelligence machine learning model security system with the determined learnings;
   apply the determined learnings to an updated digital twin;
   monitor the updated digital twin in the sandbox to determine if the updated digital twin successfully counters detected threat actor activity;
   if successfully counters detected threat actor activity, automatically apply the determined learnings to the physical network; and
   wherein the memory stores additional computer readable instructions that, when executed by the at least one processor, cause the computing platform to:

generate at least one additional dynamic honeypot based on the analyzed threat actor activity associated with the at least one dynamic honeynet;

deploy the at least one generated additional dynamic honeypot into the sandbox;

monitor the deployed at least one additional dynamic honeypot for additional threat actor activity; and transmit a notification of the detection of the additional threat actor activity and the deployment of the at least one additional generated dynamic honeypot.

2. The computing platform of claim 1, wherein information related to the threat actor activity includes behavioral information associated with an identified threat actor.

3. The computing platform of claim 1, wherein information related to the threat actor activity includes traffic logs associated with the threat actor event occurrence.

4. The computing platform of claim 1, wherein information related to the threat actor activity includes activity patterns associated with an identified threat actor.

5. The computing platform of claim 1, wherein the determined learnings include counter-security solutions.

6. The computing platform of claim 1, wherein the generated at least one additional honeypot includes opening a port of a device represented in the digital twin.

7. The computing platform of claim 1, wherein the generated digital twin comprises telemetry data collected from infrastructure components of the physical network.

8. The computing platform of claim 1, wherein the artificial intelligence machine learning model security system is trained based on known vulnerability information.

9. A method comprising:

at a computing platform comprising at least one processor, a communication interface, and memory:

generating a digital twin representing at least part of a physical network;

generating at least one dynamic honeynet, the generated dynamic honeynet associated with the digital twin;

monitoring a sandbox that includes the generated digital twin and the generated at least one dynamic honeynet for threat actor activity;

detecting threat actor activity located in the sandbox;

analyzing with an artificial intelligence machine learning model security system, the detected threat actor activity;

determining learnings from the analyzed threat actor activity, the learnings comprising counter-security policies;

updating the artificial intelligence machine learning model security system with the determined learnings;

applying the determined learnings to an updated digital twin;

monitoring the updated digital twin in the sandbox to determine if the updated digital twin successfully counters detected threat actor activity;

if successfully counters detected threat actor activity, automatically applying the determined learnings to the physical network, and wherein the computing platform further comprises the steps of:

generating at least one additional dynamic honeypot based on the analyzed threat actor activity associated with the at least one dynamic honeynet;

deploying the at least one generated additional dynamic honeypot into the sandbox;

monitoring the deployed at least one additional dynamic honeypot for additional threat actor activity; and transmitting a notification of the detection of the additional threat actor activity and the deployment of the at least one additional generated dynamic honeypot.

10. The method of claim 9, wherein information related to the threat actor activity includes behavioral information associated with an identified threat actor.

11. The method of claim 9, wherein information related to the threat actor activity includes traffic logs associated with the threat actor event occurrence.

12. The method of claim 9, wherein information related to the threat actor activity includes activity patterns associated with an identified threat actor.

13. The method of claim 9, wherein the determined learnings include counter-security solutions.

14. The method of claim 9, wherein the generated at least one additional honeypot includes opening a port of a device represented in the digital twin.

15. One or more non-transitory computer-readable media storing instructions that, when executed by a computing platform comprising at least one processor, a communication interface, and memory, cause the computing platform to:

generate a digital twin representing at least part of a physical network;

generate at least one dynamic honeynet, the generated dynamic honeynet associated with the digital twin;

monitor a sandbox that includes the generated digital twin and the generated at least one dynamic honeynet for threat actor activity;

detect threat actor activity located in the sandbox;

analyze with an artificial intelligence machine learning model security system, the detected threat actor activity;

determine learnings from the analyzed threat actor activity, the learnings comprising counter-security policies;

update the artificial intelligence machine learning model security system with the determined learnings;

apply the determined learnings to an updated digital twin;

monitor the updated digital twin in the sandbox to determine if the updated digital twin successfully counters detected threat actor activity;

if successfully counters detected threat actor activity, automatically apply the determined learnings to the physical network; and wherein the one or more non-transitory computer-readable storing instructions that when executed by the computing platform comprising at least one processor, a communication interface, and memory, further cause the computing platform to:

generate at least one additional dynamic honeypot based on the analyzed threat actor activity associated with the at least one dynamic honeynet;

deploy the at least one generated additional dynamic honeypot into the sandbox;

monitor the deployed at least one additional dynamic honeypot for additional threat actor activity; and transmit a notification of the detection of the additional threat actor activity and the deployment of the at least one additional generated dynamic honeypot.

16. One or more non-transitory computer-readable of claim 15, wherein information related to the threat actor activity includes behavioral information associated with an identified threat actor.

17. One or more non-transitory computer-readable of claim 15, wherein information related to the threat actor activity includes traffic logs associated with the threat actor event occurrence.

* * * * *